United States Patent

[11] 3,573,380

[72] Inventor Sidney Darlington
Passaic Township, Morris County, N.J.

[21] Appl. No. 824,784
[22] Filed May 15, 1969
[45] Patented Apr. 6, 1971

[73] Assignee Bell Telephone Laboratories, Incorporated
Murray Hill, N.J.

[54] SINGLE-SIDEBAND MODULATION SYSTEM
20 Claims, 5 Drawing Figs.

[52] U.S. Cl. .......... 179/15, 332/45
[51] Int. Cl. .......... H04j 1/18, H03c 1/60
[50] Field of Search .......... 179/15 (SSB), 15 (AEC), 15 (ACS); 332/45, 9, 10

*Primary Examiner*—Kathleen H. Claffy
*Assistant Examiner*—Tom D'Amico
*Attorneys*—R. J. Guenther and William L. Keefauver

ABSTRACT: A multichannel, frequency-division multiplex, single-sideband modulation system is realized by using digital filters and product modulators in lieu of conventional analog filters and product modulators. Extremely high multiplication rates resulting from a direct substitution of digital for analogue operations are substantially reduced by using multirate digital filters and a combined multichannel implementation of said product modulators and a portion of said multirate digital filters.

INVENTOR
S. DARLINGTON
BY Gerard E. Murphy
ATTORNEY

SINGLE-SIDEBAND MODULATION SYSTEM

BACKGROUND OF THE INVENTION

1. Field of the Invention

This invention pertains to modulation systems and, more particularly, to single-sideband modulation systems using digital filters.

Fundamental to the communication of information is efficiency of transmission, whether measured in terms of bandwidth, power required, complexity of the circuitry or other applicable criteria. Efficiency of transmission necessitates that the information to be communicated to a distant point be processed before transmission over an intervening medium. In terms of modern communications, signal processing comprises modulation, in one form or another, of an information-bearing signal. Modulation not only makes transmission possible at frequencies higher than the frequencies of the information-bearing components of the applied signal, but also permits frequency multiplexing, i.e., staggering of frequency components over a specified frequency spectrum.

It is well known that the process designated as amplitude modulation is wasteful of the frequency spectrum, since transmitting both sidebands of a modulated signal requires double the bandwidth needle for only one sideband, and is wasteful of power, particularly since the transmitted carrier conveys no information. Thus, as the useful frequency spectrum has become congested, resort has been made to a form of modulation, i.e., single-sideband, where only one sideband, as the name implies, is transmitted. Of course, to maximize efficiency of transmission, the manner in which single-sideband modulated signals are generated must be made as efficient and economical as is technologically possible. Particularly is this true in those large frequency multiplex systems where thousands, if not tens of thousands, of single-sideband modulators are utilized.

2. Description of the Prior Art

In a typical frequency division multiplex system, each of a plurality of applied baseband signals is processed by a preassigned channel modulation subsystem prior to combination with each of the other processed baseband signals to form a multiplexed signal group. A typical modulation subsystem is disclosed in the Proceedings of the IRE, at page 1703, Dec. 1956. A further discussion of related subsystems may be found in my copending (Case 36), Ser. No. 776,395 filed on Nov. 18, 1968 and entitled "Single-Sideband Modulator." Modulators of the type described utilize analogue filters. The rapid development of integrated circuit technology and the potential for large scale integration of digital circuits has made digital filters much more attractive than their analog counterparts. The straightforward substitution, however, of digital filters for analog filters results in a system which requires an undesirably high number of computational steps per second, due to the large number of computation steps required per computation cycle and the large number of computation cycles per second required to avoid interchannel interference.

It is therefore an object of this invention to substantially reduce the number of computational steps per second required in digital realizations of single-sideband modulation systems.

It is another object to eliminate interchannel interference in systems of the type described.

SUMMARY OF THE INVENTION

In accordance with the principles of this invention, these and other objects are accomplished by utilizing a multirate digital filter. More particularly, a multirate digital filter is used which comprises a first digital filter, having a first predetermined sampling rate, and a second digital filter, having a sampling rate which is a predetermined multiple of said fist sampling rate, and a second digital filter, having a sampling rate which is a predetermined multiple of said first sampling rate, and a second digital filter, having a sampling rate which is a predetermined multiple of said first sampling rate, connected in cascade. The first of said filters may be a "slow" recursive digital filter and the second filter may be a "fast" nonrecursive digital filter. Further in accordance with this invention, a substantial reduction in computation time is realized by mechanizing said second filters, in combination, as a single discrete convolution. By reordering the required computational steps, the number of multiplicative operations is further reduced.

DETAILED DESCRIPTION OF THE INVENTION

Figures 1, 2A, 2B:
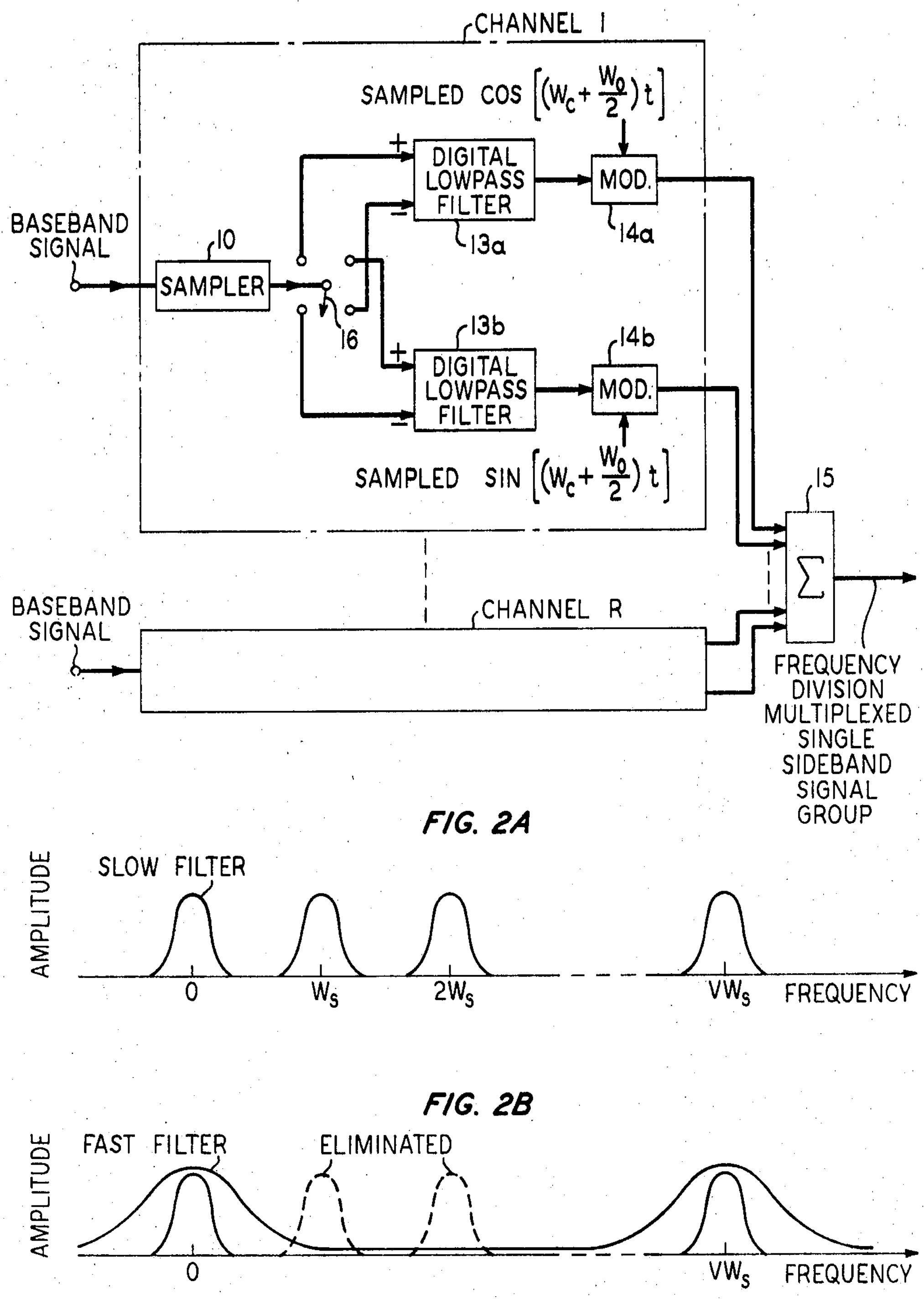
FIG. 1 illustrates a digital implementation of a multichannel, frequency division multiplex, single-sideband modulation system.
FIGS. 2A and 2B depict multichannel interference problems arising in conventional modulation systems and the manner in which they are eliminated by the present invention.

FIG. 1 depicts a multichannel, frequency division multiplex, single-sideband modulation system, wherein each of the R channel modulation subsystems is a digital implementation of a single-sideband modulator of the type shown and described in my aforementioned copending application, Ser. No. 776,395, filed Nov. 18, 1968.

Briefly, in each channel, an applied baseband signal is sampled by apparatus 10, modulated by commutator device 16, and applied to two circuit branches, each comprising a digital low-pass filter 13*a*, 13*b* and a product modulator 14*a*, 14*b*. The signals emanating from each of the R channels of FIG. 1 are arithmetically combined in adder network 15 to develop the desired frequency division multiplexed signal group. Modulating signal sources for the various product modulator, e.g. 14*a*, of each channel, have not been shown in order to avoid undue complexity; instead an arrow terminating at a modulator with an identifying legend represents an applied sampled sinusoidal signal from an auxiliary signal source of any well-known construction. Each channel, of course, has a different carrier frequency, $w_c$, for example, adjacent multiples of 4000 Hz.

The straightforward substitution of a digital filter for a conventional analog filter requires apparatus which performs a number of multiplicative operations per sample interval. For the efficient mechanization of a group of filters, such apparatus should be common to some or all of the various filters on a time-shared basis. However, time-sharing increases the rate at which the apparatus must perform the multiplicative operations. The required multiplication rate is further increased by the necessity of avoiding interchannel interference. Assuming a conventional baseband signal of 4000 Hz for illustrative purposes, the basic Nyquist sample rate, $w_s$, would be 8000 samples per second. However, the signal outputs of the digital filters include frequency-shifted signals in many other passbands than that of their analog filter counterparts, as shown in FIG. 2A. With an output sample rate as low as the baseband Nyquist rate, the extraneous passbands are so closely spaced that they produce interchannel interference in the carrier system of FIG. 1. This interchannel interference can be avoided by operating the digital filters at a higher number of computational cycles or iterations per baseband Nyquist interval, but this increases the required multiplication rate by another factor. Accordingly, it is an object of this invention to reduce the multiplication rate and eliminate interchannel interference in a digital system which modulates and combines a plurality of baseband signals to form a multiplexed single-sideband carrier signal group.

Figure 3:
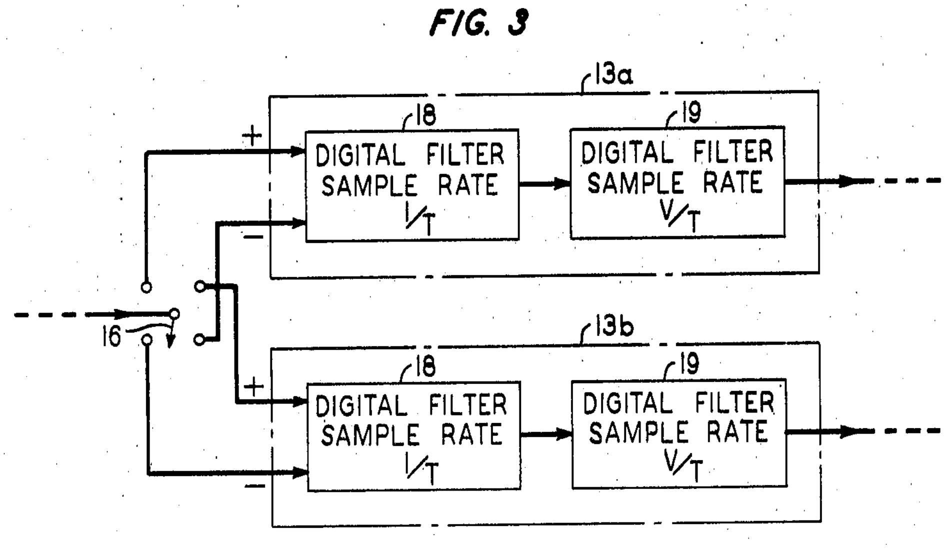
FIG. 3 shows a multirate digital filter realization of the lowpass filters used in the system of FIG. 1.

By the practice of this invention, the multiplication rate is reduced by utilizing a multirate sampling scheme for each of the individual digital filters used in the channels of FIG. 1. Each channel filter, 13$a$, 13$b$, is mechanized as two digital filters, 18 and 19, operating in cascade, as shown in FIG. 3. The first filter 18 operates at one computational cycle per baseband Nyquist interval, $T$, and develops one output sample per Nyquist interval. The second filter 19 operates at $v$ computation cycles per Nyquist interval and develops $v$ output samples per Nyquist interval, where $v$ is an integer, generally at least as large as the number of modulation channels used, i.e. R. In terms of frequency response functions, the first "-slow" filter 18 develops the desired sharp cutoff required of filters use in efficient multichannel systems. The second "fast" filter 19 may have a slow cutoff and thereby eliminate undesirable passbands, as shown in FIG. 2B. Since filter 19 has a slow cutoff, it can be implemented using fewer computations per computation cycle. The individual passbands need not be flat, provided their passband distortions are complimentary. Thus, in accordance with this invention, the slow cutoff of the second filter, i.e. filter 19 is obtained by using a digital filter having a frequency function with relatively few poles, thereby reducing the number of multiplications per fast computational cycle. The combined frequency response of filters 18 and 19, of course, corresponds to the desired analog filter characteristic. The design of such filters is well known to those skilled in the art. Further advantages of this invention are obtained by modifying and transforming digital filters 13$a$ and 13$b$ of FIG. 1, operating at $v$ computation cycles per Nyquist interval, as described below.

For each and every input sample to said filters, there are $v$ predetermined computational cycles of iterations, resulting in $v$ output samples. It may be shown that the difference equation describing such a digital filter is as follows;

$$y(n)=-\sum_{\sigma=1}^{M} a_\sigma y(n-\sigma)+\sum_{\sigma=0}^{M} b_\sigma x(n-\sigma) \quad n=1, 2, \ldots$$

subject to the condition $_r$=0 except at $r=v\mu$ $\mu$=1,2,... (1)

where $y$ corresponds to discrete samples of the output signal, $x$ corresponds to discrete samples of the input signal, $a$ and $b$ are predetermined coefficients related to the transfer function of the desired filter, and $M$ corresponds to the number of poles of the filter. The condition imposed that $x$ be equal to zero except at integral multiples of $v$ is a necessary condition since there are $v$ output samples for every input sample. Equation 1 is equivalent to the following set of equations:

$$z(v\mu)=-\sum_{\sigma=1}^{M} \hat{a}_\sigma z(v[\mu-\sigma])+x(v\mu) \quad \mu=1, 2, \ldots \tag{2a}$$

$$y(n)=\sum_{\sigma=0}^{vM} \hat{b}_\sigma z(n-\sigma) \quad n=1, 2, \ldots \tag{2b}$$

$$z(n)=0 \text{ except at } r=v\mu \quad \mu=1, 2, \ldots \tag{2c}$$

The physical implementation of these transformed equations is a slow recursive filter (one with a low sampling rate), characterized by eq. 2$a$, in cascade with a fast nonrecursive filter (one with a high sampling rate), characterized by eq. 2$b$. While the number of terms in the sum defined by eq. 2$b$is $VM$+1, no more than $M$+1 of these are nonzero in any one iteration. Accordingly, filters characterized by eqs. 2$a$ and 2$b$ may be used for filters 18 and 19, respectively, shown in FIG. 3. Since the desired frequency characteristics and the definitive difference equations are known, the implementation of such filters and all other filters disclosed herein is straightforward. See, for example, the article entitled "Digital Filters," authored by J. F. Kaiser, in System Analysis by Digital Computer, Kuo & Kaiser, p. 218, John Wiley & Sons, New York, N.Y. 1966. Further advantages flowing from the use of filters so characterized arise from their ability to be manipulated and combined.

In analog terms a linear circuit may be mechanized as either a differential equation or a convolution integral. A corresponding digital circuit can use a discrete approximation of either of these forms. Mechanization as a discrete convolution relates each new output sample to a linear combination of present and past input samples only. The exact convolution equivalent of a recursive difference equation of finite order requires a sum over all past input samples back in time to minus infinity. However, equally satisfactory operation may be obtained by using a sufficiently large finite number, $N$, of past samples. On the other hand, the combination of filters in accordance with eqs. 2$a$ and 2$b$ involves no such approximation or truncation.

When the second filters of each pair, i.e. filter 19, described above and used in each of the R channels of FIG. 1, are nonrecursive, per eq. 2$b$, their performance may be described by the discrete convolution formula. Since there are 2R filters (because there are two paths for each of the R carrier channels of FIG. 1), the convolution may be expressed as follows:

$$y_n^{(k)}=\sum_{r=n-N}^{n} W_{n-r}x_r^{(k)}, \quad k=1, 2, \ldots 2R$$

$$x_r^{(k)}=0 \text{ except when } r=v\mu \quad \mu=1, 2, \ldots \tag{3}$$

where $y_n^{(k)}$ is the output of filter $k$, i.e. one of filters 19, at (fast) sample time $n$, $x_r^{(k)}$ is the input at (fast) sample time $r$, and $W$ is the well-known convolution weighting function. The input samples come from preceding filters 18 at a rate of $1/T$ s.p.s. Hence, $x_r^{(k)}$=0 except at integral multiples of $v$. Equations of this form may be derived, for example, from eqs. 2$b$ and 2$c$ with only slight changes in notation.

The desired output of the R channel carrier system, at sample time $n$, is obtained by multiplying $y_n^{(k)}$, i.e. the output of each filter 19, by a modulation factor $M_n^{(k)}$, e.g. the sampled sinusoidal functions shown as inputs to modulators 14 of FIG. 1, and then summing all the respective multiplied signals, i.e. summing over variable $k$ as follows:

$$S_n=\sum_{k=1}^{2R} M_n^{(k)}y_n^{(k)}=\sum_{k=1}^{2R} M_n^{(k)} \sum_{r=n-N}^{n} W_{n-r}x_r^{(k)}, \tag{4}$$

$S_n$ corresponds to the modulated multiplexed signal group. Interchanging the order of the summation results in the following:

$$B_{n,r}=\sum_{k=1}^{2R} M_n^{(k)}x_r^{(k)} \tag{5a}$$

$$S_n=\sum_{r=n-N}^{n} W_{n-r}B_{n,r} \tag{5b}$$

Figure 4:
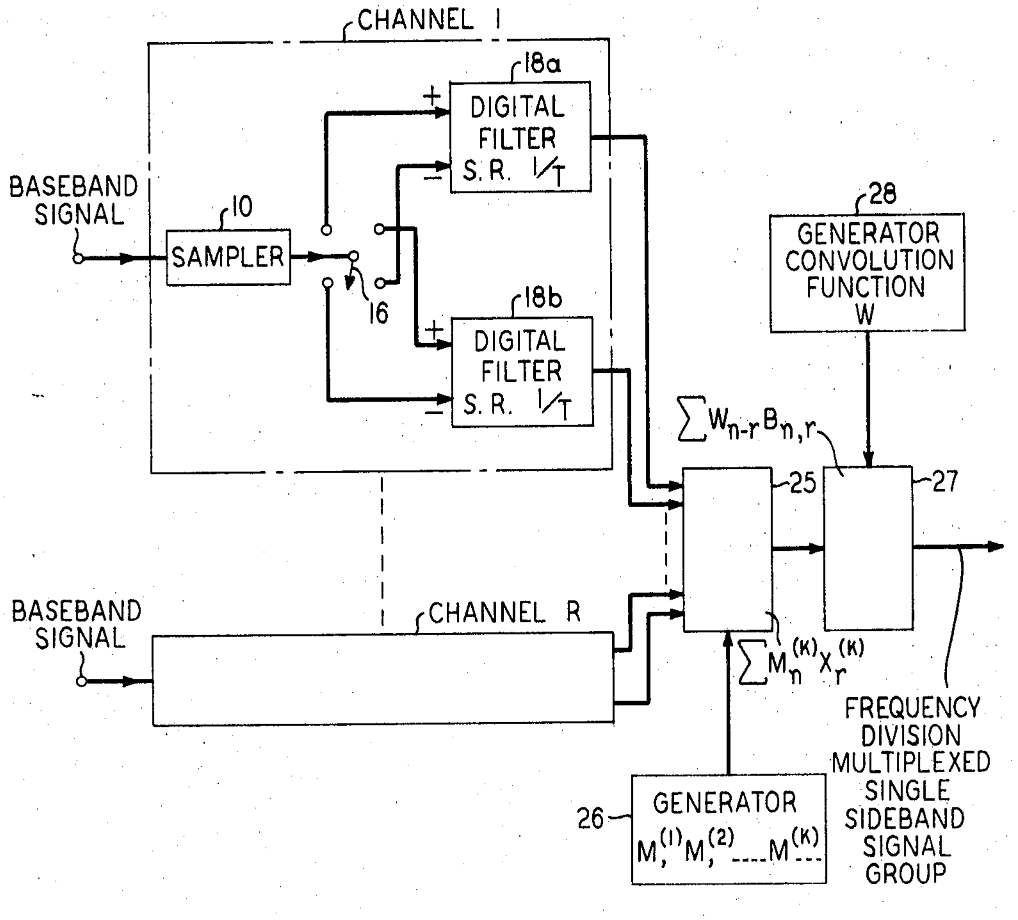
FIG. 4 illustrates a digital filter implementation of a single-sideband frequency multiplex modulation system in accordance with this invention.

The mechanization of equations 5$a$ and 5$b$ is shown in FIG. 4. The convolution function represented by $W$, which as described above is related to the transfer function of the desired filter, need be calculated only once per computation cycle, instead of once for each of the 2R filters. Accordingly, the multiplication rate is substantially reduced. Since the function $B_{n,r}$, defined in equation 5$a$, is equal to zero whenever $x_r$ is equal to zero, a set of coefficients $B_{n,r}$ need only be calculated for various values of $n$, corresponding to $r=v\mu$, once each baseband sample interval.

Further substantial simplifications in the computation of $B_{n,r}$ may be obtained by choosing carrier frequencies and sampling rates related in suitable ways. For example, a baseband sample rate of 8000 samples per second and a fast sample rate of 16 ×8000 samples per second are appropriate for a 12 channel group with carrier frequencies at (72,000 +c4,000)

Hz., $c=0, 1, \ldots 11$. Then $|B_{n,r}|$ is periodic in $n$ with period 32, and hence need only be calculated for 32 values of $n$. Furthermore, the calculation of the 32 values need involve no more than 76 multiplications per baseband Nyquist interval if they are properly arranged.

The system of FIG. 4, which bears a strong resemblance to that depicted in FIG. 1, therefore comprises R carrier channels each of which uses digital filters 18*a*, 18*b* having a slow sample rate, $1/T$. Digital filters 19 on the other hand, are realized in a combined fashion as a discrete convolution in accordance with equations 3, 4 and 5. Accordingly, the output signals of filters 18*a* and 18*b* of each channel are supplied to computation apparatus 25 which develops a signal proportional to the product $B_{n,r}$ defined by equation (5*a*). Various predetermined sampled modulating signals $M_n^{(k)}$ are supplied by generator apparatus 26, which may comprise a plurality of signal sources. After development of the signal function $B_{n,r}$ by apparatus 25, the signal is supplied to computation apparatus 27 which develops a signal proportional to the product defined by equation 5*b*. The proper value of the convolution weighting function $W$ is supplied by conventional generator apparatus 28. The resulting output is the desired frequency division multiplexed digital single-sideband signal group. In the interest of clarity, timing apparatus has not been shown; it is of course conventional. Computation apparatus 25 and 27 may be realized in a manner well-known to those skilled in the art by a straightforward combination of multiplier and adder circuits. Illustratively, the functions performed by apparatus 25, 26, 27 and 28 can be performed by a special purpose digital computer of the type, e.g. manufactured by the TIME/DATA Corporation, Palo Alto, California and designated as Model TIME/DATA 100.

It is to be understood that the embodiments shown and described herein are illustrative of the principles of this invention only, and that modifications of this invention may be implemented by those skilled in the art without departing from the scope and spirit of the invention. For example, the illustrative system of this invention may be realized using integrated and solid-state circuit technologies.

I claim:

1. A single-sideband modulation system including a plurality of signal channels responsive to applied baseband signals, each channel comprising:
- means for sampling an applied baseband signal;
- means for selectively modulating said sampled baseband signal; and
- a pair of circuit branches, each branch including multirate digital filter means and modulation means for processing said selectively modulated sampled baseband signal.

2. The system as defined in claim 1 wherein said multirate digital filter means comprises:
- a first digital filter operating at a first predetermined computation rate; and
- a second digital filter, serially connected to said first digital filter, operating at a second predetermined computation rate.

3. The multirate digital filter of claim 2 where said first predetermined computation rate is proportional to the basic Nyquist rate of said baseband signal and said second predetermined computation rate is a preselected multiple of said first computation rate.

4. The system as defined in claim 1 wherein said multirate digital filter means comprises a recursive digital filter in cascade with a nonrecursive digital filter.

5. A single-sideband modulation system including a plurality of signal channels responsive to applied baseband signals and means for combining signals processed by said signal channels, each channel comprising:
- means for sampling an applied baseband signal;
- means for modulating said sampled baseband signal; and
- a pair of circuit branches, each branch including multirate digital filter means for altering said modulated sampled baseband signal and means for modulating said altered signal with predetermined sampled modulating functions.

6. The system as defined in claim 5 wherein said multirate digital filter means comprises a first digital filter operating at a first predetermined computation rate connected in cascade with a second digital filter operating at a second predetermined computation rate.

7. A multirate digital filter of claim 6 where said first predetermined computation rate is proportional to the basic Nyquist rate of said baseband signal and said second predetermined computation rate is a preselected multiple of said first computation rate.

8. The system as defined in claim 5 wherein said multirate digital filter means comprises a recursive digital filter in cascade with a nonrecursive digital filter.

9. Single-sideband modulation apparatus comprising:
- a plurality of channel means, each of said channel means including sampling means, commutation means, and a pair of circuit branches responsive to signals developed by said commutation means, said circuit branches each further comprising first digital filter means operating at a predetermined sampling rate and second digital filter means operating at a preselected multiple of said predetermined sampling rate;
- means for modulating signals emanating from said second digital filter means; and
- means for combining said modulated signals.

10. Single-sideband modulation apparatus comprising:
- a plurality of channel means, each of said channel means including sampling means, modulation means, and a pair of circuit branches responsive to signals developed by said modulation means, each of said circuit branches further comprising digital filter means operating at a predetermined sampling rate;
- means for selectively modulating signals emanating from said digital filter means;
- means for combining said selectivity modulated signals; and
- means for developing a signal proportional to the discrete convolution of said combined signals.

11. A single-sideband modulation system comprising;
- a plurality of signal channels, each channel responsive to an applied baseband signal and including means for sampling said baseband signal, commutation means for selectively modulating said sampled baseband signal, and a pair of circuit branches responsive to said commutation means, each circuit branch comprising digital filter means;
- means for generating predetermined modulating signals;
- means for developing a signal proportional to the product of said modulating signals and signals from said digital filter means;
- means for developing a signal proportional to the sum of said proportional product signals; and
- means for developing a signal proportional to the discrete convolution of said proportional sum signal.

12. The system of claim 11 wherein said digital filter means operates at a computation rate proportional to the basic Nyquist rate of said baseband signal.

13. The system as defined in claim 11 wherein said digital filter means comprises a recursive digital filter.

14. A modulation system comprising;
- a plurality of signal channels, each channel responsive to an applied baseband signal and including means for sampling said baseband signal, means for selectively modulating said sampled baseband signal, and digital filter means for processing said modulated, sampled baseband signal;
- means for generating predetermined sampled functions;
- means for developing a signal proportional to the sum of the product of signals processed by said digital filter means and said sampled functions; and
- means for developing a signal proportional to a predetermined convolution of said proportional sum signal.

15. The system as defined in claim 14 wherein said digital filter means comprises a pair of parallel connected digital filters operating at a predetermined computation rate.

16. The digital filter means of claim 15 wherein said predetermined computation rate is proportional to the basic Nyquist rate of said baseband signal.

17. The system as defined in claim 14 wherein said digital filter means comprises a pair of parallel connected recursive digital filters.

18. In a frequency division multiplex, single-sideband carrier system wherein a plurality of baseband signals are applied to a corresponding plurality of carrier channels which include means for sampling said baseband signals and means for modulating said sampled baseband signals, the improvement comprising:

digital filter means responsive to each of said modulating means;

a source of a plurality of preselected sampled modulating signal functions;

means for forming a signal proportional to the sum of the product of signals, emanating from said digital filter means, and said sampled modulating signal functions; and means for forming the discrete convolution of said signal sum to develop a group of single-sideband modulated signals.

19. A single-sideband modulation system including a plurality of signal channels responsive to applied baseband signals, each channel comprising:

means for sampling an applied baseband signal;

means for selectively modulating said sampled baseband signal;

multirate digital filter means for processing said modulated, sampled baseband signal; and means for modulating said processed signal.

20. In a frequency division multiplex, single-sideband carrier system wherein a plurality of baseband signals are applied to a corresponding plurality of carrier channels which include means for sampling said baseband signals and means for modulating said sampled baseband signals, the improvement comprising;

digital filter means connected to each of said modulating means for processing said sampled baseband signals; and means for forming the discrete convolution of said processed signals to develop a group of single-sideband modulated signals.